United States Patent

[11] 3,595,263

| [72] | Inventor | Wilbert D. Greenlaw |
| | | Westwood, Mass. |
| [21] | Appl. No. | 787,012 |
| [22] | Filed | Dec. 26, 1968 |
| [45] | Patented | July 27, 1971 |
| [73] | Assignee | Crosby Valve & Gage Company |
| | | Wrentham, Mass. |

[54] PILOT ACTUATED UNBALANCED PISTON RELIEF VALVE
18 Claims, 2 Drawing Figs.

[52] U.S. Cl. ................................................. 137/491, 251/28
[51] Int. Cl. .............................................. F16k 17/10
[50] Field of Search .......................................... 137/489, 491, 488; 251/84, 86, 24, 28

[56] References Cited
UNITED STATES PATENTS

| 643,239 | 2/1900 | Schreidt | 137/488 |
| 3,100,503 | 8/1963 | Tennis | 137/491 |
| 3,177,889 | 4/1965 | Hardison | 137/491 X |
| 3,412,756 | 11/1968 | Shore | 251/86 X |
| 3,439,702 | 4/1969 | Ferrill | 137/478 |

FOREIGN PATENTS

| 628,867 | 9/1949 | Great Britain | 137/491 |

Primary Examiner—M. Cary Nelson
Assistant Examiner—R. B. Rothman
Attorney—Kenway, Jenney & Hildreth

ABSTRACT: A relief valve member is normally held in seated position by the net force acting on two opposed surfaces thereof having unequal effective areas, both surfaces being subjected to the pressure of the vessel to be relieved. The larger of these areas is situated in a control chamber that may be vented by action of a pilot relief valve, which in turn operates a shuttle valve. The relief valve member has a passage connecting the vessel with the control chamber, this passage also continuously maintaining a control connection from the vessel to the pilot valve.

INVENTOR.
WILBERT D. GREENLAW

ATTORNEYS

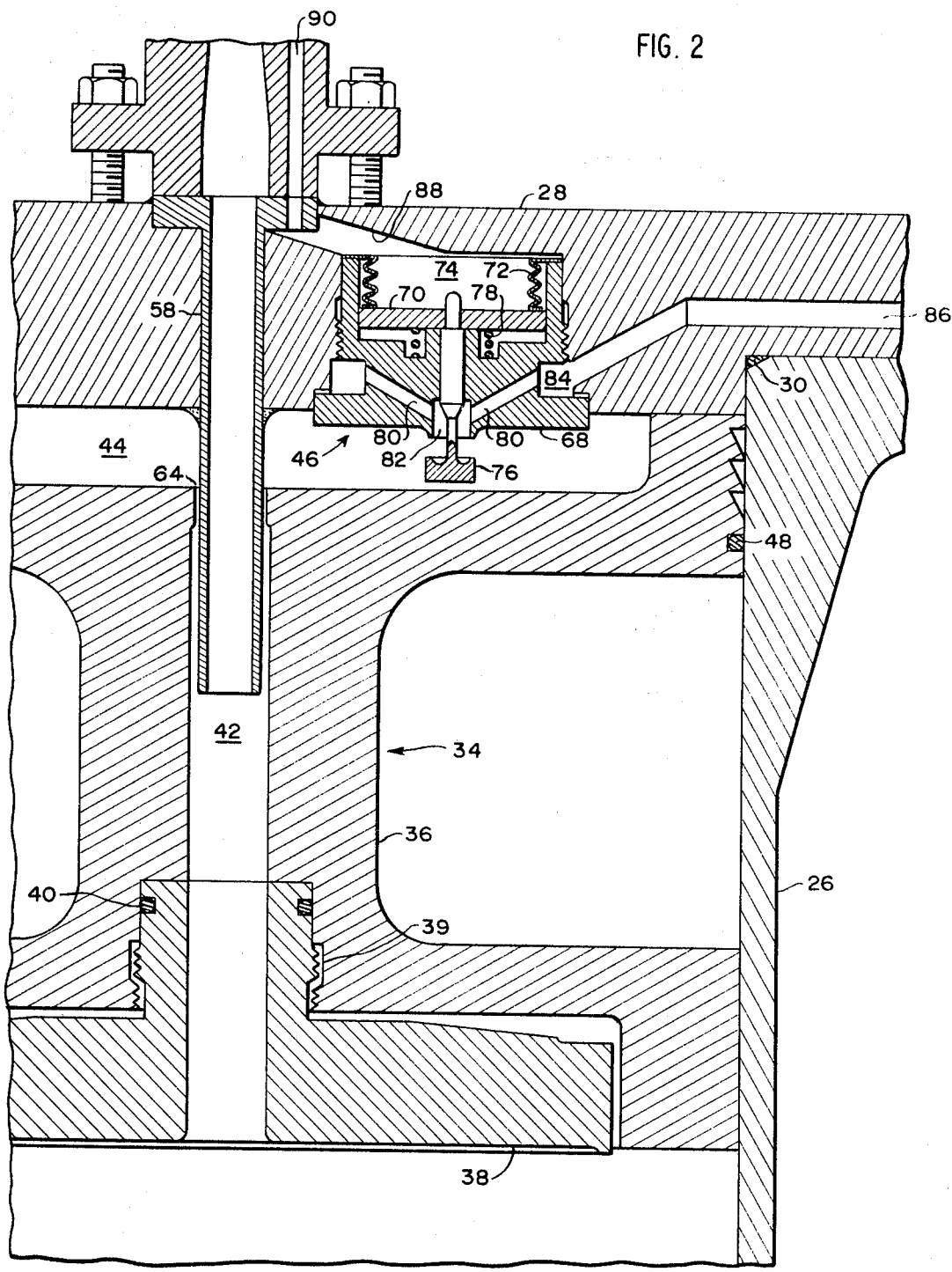

PILOT ACTUATED UNBALANCED PISTON RELIEF VALVE

BACKGROUND OF THE INVENTION

The field of this invention relates generally to safety relief valves, and more particularly to relief valves of the type normally held closed by the net force acting on unequal opposed areas thereof subjected to the pressure of the vessel to be relieved.

It is common to provide pilot valves for operating such relief valves, both to open them and to close them by altering the pressure forces applied to such opposed areas. In one typical design the larger of the opposed areas is in a control chamber which, like the smaller area, has a fluid connection to the vessel to be relieved. This chamber is vented by a pilot valve which is mounted directly upon it. This arrangement is subject to instability because the operation of the pilot valve, which is usually a pop type of relief valve, is dependent on the pressure in the control chamber. The latter pressure is dependent on the flow from the pilot valve, the flow into the control chamber, and the position or state of operation of the main valve. The main valve does not move to open position until the control chamber pressure has been reduced to a predetermined value. Hence the pilot valve must remain in stable open position while the main valve moves to initiate system relief. However, if the control chamber pressure drops a small amount below the predetermined value just before the main valve opens, it may cause the pilot valve to reseat prematurely and prevent opening of the main valve.

Because of this instability, it is common to provide a bypass control connection from the pilot valve to the inlet passage in the main valve. A bypass connection of this type which is external to the valve body is vulnerable to damage which may prevent the main valve from operating properly.

Another means of stabilizing the pilot operation consists in providing two pilot valves, one to control the opening and the other to control the closing of the main valve.

Another known form of relief valve has a pilot valve mounted remotely from the main valve, this pilot being adapted to control a shuttle or slave valve which vents the control chamber. The remote placement of the pilot valve not only has the disadvantage of possible breakage of connecting lines, but also makes the pilot valve subject to pressure fluctuations in the connecting lines resulting from fluid flow conditions.

Some existing pilot-controlled relief valves have uncertain or sluggish operation when handling fluids such as low-pressure steam. These fluids tend to condense in the control chamber and other parts with resultant buildup of saturated liquid. Then, when the pilot valve opens, the pressure drop in the control chamber will be affected by the slow "boil-off" of the saturated liquid (depending upon its thermodynamic properties). Thus the rate of pressure drop in the control chamber in response to the pilot valve opening may be such that the main valve does not open, or is very sluggish in operation.

SUMMARY OF THE INVENTION

This invention achieves a solution of the foregoing operational problems through the use of a single pilot relief valve subject to control through an internal connection to the inlet of the main relief valve. This control connection is continuously effective, thereby rendering the operation of the pilot valve substantially independent of the operation of the main valve, but without the necessity for external bypass connections as above described.

A related feature is the use of a shuttle valve under the control of the pilot valve.

By the foregoing means, stable operation is obtained in applications including the protection of low-pressure steam vessels, without external bypass or pilot control connection lines.

BRIEF DESCRIPTION OF THE DRAWING

FIG. 2 is an enlarged partial elevation in section showing details of the shuttle valve, with the valves in the open or relief position.

DESCRIPTION OF THE PREFERRED EMBODIMENT

Figure 1:
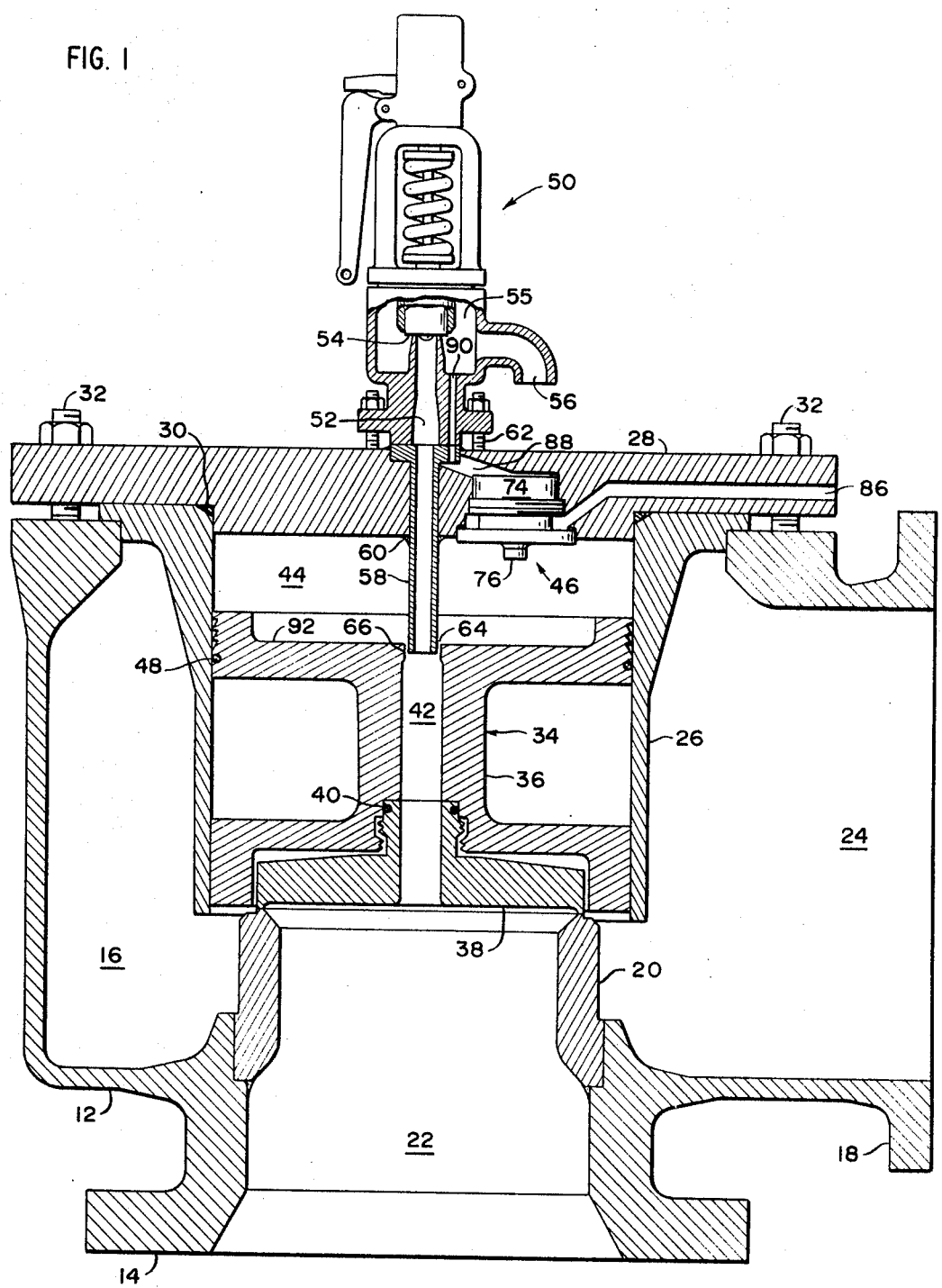
FIG. 1 is an elevation in section of a preferred embodiment, illustrating the valves in the normal closed position.

The main valve body 12 comprises an integral casting having an inlet flange 14 for connection to a vessel containing a fluid under variable pressure, such as steam. The body also has a chamber 16 and an outlet or exhaust connecting flange 18. A tubular nozzle 20 having a generally flat valve-seating surface is seal welded in an annular recess on a boss projecting into the chamber 16. Thus an inlet passage 22 and a relief or outlet passage 24 are defined.

The body 12 has an open side in which is fitted a flanged sleeve-shaped valve guide 26 having a smooth cylindrical inner surface. A top plate or cover 28 is placed over the flange of the member 26, and has an annular fluid seal with the latter provided by an O-ring 30. The plate 28 is held in place on the body 12 by screws 32.

A valve member designated generally at 34 includes a piston member 36 and a valve insert 38. The piston has a central recess 39 with threads to receive a portion of the valve insert which is also threaded. In the fully assembled position as shown, the respective threads of the parts are not in engagement, and the valve insert 38 is retained by and pivotally movable in relation to the piston 36 for self-alignment with the valve seat. These parts are mutually sealed by an annular O-ring 40.

In the normal position of the relief valve, the valve insert 38 is seated upon the nozzle 20, thereby closing the inlet passage 22. This position results from the unbalance of pressure forces acting upon the valve member 34, which is explained as follows. The insert 38 and the piston 36 have holes defining a connection 42 from the inlet passage 22 to a control chamber 44 defined by the piston 36, the sleeve 26 and the cover 28. The inner diameter of the sleeve 26 is greater than the effective diameter of the insert 38 in the seated position. In the normal closed position, the pressure in the chamber 44 equals that in the inlet 22, and the net force applied to the valve member 34 holds it in the seated position. The valve is held in the seated position at all pressures until the space 44 is vented to atmosphere through the opening of a shuttle valve designated generally at 46, hereinafter more fully described. An annular O-ring 48 provides a fluid seal between the piston 36 and the sleeve 26, which is effective at all pressures up to that at which the shuttle valve 46 is opened.

The shuttle valve 46 is opened by the action of a spring-loaded, pressure actuated pilot relief valve designated generally at 50. This valve is of conventional form and is of the type designed to pop open to its substantially fully open position when the pressure at its inlet 52 reaches a predetermined value corresponding to that at which the main safety valve is intended to open. This lifts a valve member 54 from its seat and allows fluid from the inlet 52 to enter an exhaust chamber 55 communicating with the atmosphere through an exhaust outlet 56. A flanged tube 58 is received in a countersunk central hole in the plate 28 and seal welded or soldered to the latter at 60. The value 50 is fitted over the member 58 and fastened by screws to the plate 28.

The tube 58 extends into the control chamber 44 and enters an end of the passage 42 in the piston 36. The end of the tube 58 is situated within the passage 42 in all positions of the valve from the fully open position illustrated in FIG. 2 to the fully closed position illustrated in FIG. 1. The outer diameter of the tube 58 provides a limited annular clearance 64 with respect to an accurately machined, inwardly projecting annular portion 66 of the piston 36, this clearance providing a restricted flow passage for fluid from the inlet 22 to the control chamber 44 in both the open and closed positions of the main relief valve.

Details of the shuttle valve 46 are shown in FIG. 2. This valve has a housing 68 threaded into a recess in the plate 28 on the side facing the control chamber 44. This housing has a tubular end portion in which is received a piston 70 and a metallic bellows seal 72. The bellows is sealed at one end to the housing 68 and at the other end to the piston 70, thereby forming an expansible chamber 74. A shuttle valve member 76 is slidably received in the housing 68 and into a hole in the piston 70. A compression spring 78 bears at one end on the housing 68 and at the other end on the piston 70, tending to reduce the chamber 74 and allow the valve member 76 to seat upon the housing 68. Passages 80 extend from a central recess 82 in the housing to an annular space 84 which communicates with a drilled exhaust passage 86 in the plate 28 connected with ambient atmosphere. These passages and spaces comprise a vent connection to the atmosphere bypassing the pilot relief valve member 54 and its seat.

The chamber 74 is connected by another drilled passage 88 in the plate to a hole in the flange of the tube 58 in communication with a hole 90 in the body of the pilot valve 50. The hole 90 is in communication with the exhaust chamber 55 of the pilot valve.

The condition of the above-described relief valve under normal operating conditions is illustrated in FIG. 1. The valve insert 38 is seated upon the nozzle 20 because the pressure in the control chamber 44 equals that at the inlet 22. This pressure also holds the shuttle valve member 76 against its seat because the chamber 74 is vented to atmosphere through the holes 88 and 90 and the outlet 56 of the pilot valve 50. The valve 50 is fully closed and maintains the illustrated positions of the parts until the pressure in the inlet passage 22 reaches the control valve for which the valve 50 has been set.

At the control pressure the valve 50 quickly snaps to its fully open position in a conventional manner, permitting the flow of fluid from the inlet 22 through the passage 42 and the tube 58 to the exhaust chamber 55. The outlet 56 sufficiently restricts the flow of fluid to permit an increase in the fluid pressure in the exhaust chamber 55, which is communicated to the chamber 74 in the shuttle valve. Since the effective area of the piston 70 substantially exceeds that of the valve member 76, the shuttle valve is opened and vents fluid from the control chamber 44 to atmosphere through the passages 80, 84, and 86.

When the pressure in the control chamber 44 has been sufficiently reduced, the force holding the piston 36 in closed position is overcome by the inlet pressure and the valve suddenly opens to permit direct communication of the inlet 22 with the relief outlet 24. The piston 36 quickly moves to its upper limit position illustrated in FIG. 2, where it abuts the plate 28. In this position, the volume of the control chamber 44 is reduced to a minimum value determined by the depth of an annular recess 92 formed in an end surface of the piston.

The open or relief position of the main valve described above is maintained while the pilot valve 50 remains in its open position, the latter valve being substantially unaffected by the position of the main valve. This results from the fact that the tube 58 extends to the passage 42 and causes the pressure at the inlet 52 of the pilot valve to be maintained constantly at the value of the inlet 22.

When the pressure in the inlet 22 is reduced to the value at which the pilot valve 50 is set to close, this valve quickly snaps to its fully closed position in the conventional manner, whereby the pressure in the space 55 is quickly reduced to that of the ambient atmosphere. This reduces the pressure in the chamber 74 of the shuttle valve and permits the latter to close under the force of the spring 78. The closure of the shuttle valve is assisted by pressure maintained in the control chamber 44, while the shuttle valve is open, by the passage of fluid from the inlet 22 through the clearance 64.

Once the shuttle valve 46 has closed, the pressure in the reduced volume of the control chamber 44 rapidly increases to the value in the inlet 22, and this causes substantially instantaneous reclosure of the main relief valve 38.

From the above description, it will be noted that the described valve incorporates an integral flow passage directly from the inlet 22 to the pilot valve 50, which is a very short and direct connection completely protected from possible damage such as occurs in the case of remotely located pilot relief valves. Further, this connection is not restricted or controlled by any orifice, and the flow characteristics of the fluid entering the pilot valve inlet 52 are not affected by the operation of the main valve. Still further, it will be noted that the flow passage 42 is so oriented as to drain away any saturated liquid in the chamber 44 and prevent a buildup thereof.

It will be understood that various modifications of the parts may be accomplished, if desired, as well as rearrangements and other alterations of an obvious nature, without departing from the spirit or scope of this invention.

I claim:

1. A fluid relief valve having, in combination,
   a valve body having a seat connecting an inlet and an outlet and a sleeve aligned with the seat and of greater inner diameter than the seat,
   a valve member slidable in the sleeve and cooperable with the seat, the valve member and sleeve defining a control chamber, the valve member having a passage therethrough connecting the inlet and control chamber,
   and a fluid pressure actuated pilot relief valve having a valve member, a seat connected to said inlet through said passage and means operable upon actuation to vent the control chamber through a vent connection bypassing the last-mentioned valve member and seat, said pilot relief valve being substantially unaffected by the position of said first-mentioned valve member.

2. A fluid relief valve according to claim 1, in which said passage substantially restricts the flow of fluid between the inlet and the control chamber.

3. A fluid relief valve according to claim 1, in which the pilot relief valve is operable substantially independently of the pressure in the control chamber.

4. The valve according to claim 1, in which the pilot relief valve is mounted on the valve body.

5. The valve according to claim 1, in which the control connection includes a tube having an end opening within said passage.

6. The valve according to claim 5, in which the passage has clearance for leakage around the tube.

7. The valve according to claim 6, in which the tube is of sufficient length to cause said end to be within said passage in the closed and open positions of the valve member.

8. The valve according to claim 1, in which the valve member has a fluid seal with the sleeve.

9. The valve according to claim 1, in which the valve member includes a piston and a valve mutually pivotally engaged for self-alignment with the seat.

10. A fluid relief valve having, in combination,
    a valve body having a seat connecting an inlet and an outlet and a sleeve aligned with the seat and of greater inner diameter than the seat,
    a valve member slidable in the sleeve, defining a control chamber and having a passage connecting the inlet and the control chamber,
    a fluid pressure actuated shuttle valve operable to vent the control chamber,
    and a fluid pressure actuated pilot relief valve connected to said inlet through said passage, an exhaust chamber having an outlet and a fluid connection from said exhaust chamber to operate the shuttle valve.

11. The valve according to claim 10, in which the pilot relief valve is mounted on the valve body.

12. The valve according to claim 10, in which the control connection includes a tube having an end opening within said passage.

13. The valve according to claim 12, in which the passage has clearance for leakage around the tube.

14. The valve according to claim 13, in which the tube is of sufficient length to cause said end to be within said passage in the closed and open positions of the valve member.

15. The valve according to claim 10, in which the valve member has a fluid seal with the sleeve.

16. The valve according to claim 10, in which the valve member includes a piston and a valve mutually pivotally engaged for self-alignment with the seat.

17. The valve according to claim 10, in which the shuttle valve has an expansible chamber communicating with said control connection.

18. The valve according to claim 17, with an exhaust passage closed by a portion of the shuttle valve.